US005367755A

United States Patent [19]

Wood

[11] Patent Number: 5,367,755

[45] Date of Patent: Nov. 29, 1994

[54] EXPANSION TOOL

[76] Inventor: Robert D. Wood, 624 N. Owen, Pasco, Wash. 99301

[21] Appl. No.: 31,545

[22] Filed: Mar. 15, 1993

[51] Int. Cl.5 .............................................. B23P 19/04

[52] U.S. Cl. .......................................... 29/227; 29/268

[58] Field of Search ................. 29/227, 268, 225, 270, 29/278; 81/424.5, 426, 426.5; 140/121; 254/10.5

[56] References Cited

U.S. PATENT DOCUMENTS

| | | | |
|---|---|---|---|
| 692,818 | 7/1901 | Berry | 140/121 |
| 3,540,106 | 11/1970 | Goldman | 29/268 |
| 4,571,808 | 2/1986 | King | 29/268 |
| 5,140,734 | 8/1992 | Taggart | 29/268 |
| 5,209,143 | 5/1993 | Sweet | 29/268 |

*Primary Examiner*—Robert C. Watson

*Attorney, Agent, or Firm*—Floyd E. Ivey

[57] ABSTRACT

The present invention relates to expansion tools where two ends of a workpiece are to be grasped and controlled to permit ease of and safety in workpiece manipulation for installation or removal. Workpieces of specific interest include brake retaining springs used in the Rockwell Q-Series Brake. The spring shanks in retaining springs used in the Rockwell Q-Series Brake present an inline shoulder. The jaws and upstanding arm of the present invention are particularly adapted to receive an inline shoulder of a such a retaining spring and to provide spring control and ease and safety in manipulation and installation not presently realized or offered in other expansion tools.

9 Claims, 4 Drawing Sheets

EXPANSION TOOL

FIELD OF THE INVENTION

The present invention relates generally to tools for the expansion and manipulation of workpieces and relates in particular to tools for the expansion, manipulation, installation and removal of springs, and, more specifically, to tools for the expansion, manipulation and installation of retaining springs in truck and bus brake assemblies.

BACKGROUND OF THE INVENTION

The installation and removal of workpieces, including springs, frequently requires expansion and/or manipulation of the workpiece. Workpieces of particular pertinence to the present invention are coil springs.

The installation and removal of springs frequently requires expansion and/or manipulation of the spring to attach or remove spring hooks to or from pins or to insert or remove spring hooks into or from apertures. Such pins or apertures are often inaccessible and additionally require the spring to be expanded as it is manipulated. The location of such pins or apertures may require the spring hook to be unobstructed by a tool-head or arm thus limiting the tool-head or arm contact with the spring to the spring shank in order to facilitate hooking, insertion or removal or even to permit hooking, insertion or removal of the spring hook.

A spring shank may have an inclined or angular offset or an inline shoulder between the spring hook and spring coil. The shank configuration often interferes with the ability of an expansion tool to grasp the spring in attempting to expand or manipulate the spring.

The stiffness and strength of a spring may determine the potential for both the difficulty in expansion and manipulation for installation and/or removal and for injury should the spring, the tool or the operator slip during installation and/or removal. Heavy duty springs often require exertion of substantial mechanical leverage resulting in considerable stored energy which, if inadvertently released by the lever or tool slipping, may cause difficulty in spring installation or removal and additionally may cause the lever or tool operator to be injured or allow the spring to strike the operator causing injury. Thus it is desirable to have the spring, in its expanded stored energy position, to be secured or grasped at both spring shanks or hooks in order to control and reduce the potential for slipping, thereby facilitating installation, removal or manipulation and reducing the opportunities for injury.

However, the strength of the spring may be of secondary or even of no consequence when the anchoring structure is inaccessible or the spring is light duty in nature. In such event the ability to secure or grasp both spring shanks can give the greatest control for ease of manipulation as required for spring installation or removal. Thus, securing or grasping both spring shanks insures safer spring manipulation while simultaneously increasing control for spring installation and removal. The present invention secures or grasps both spring shanks by wedging the spring shank between the tines of a furcated jaw and the bearing surface of an upstanding arm which is affixed to one of the tines.

Other expansion tools used to expand and manipulate brake springs are now identified as related art and are disclosed in accordance with 37 CFR 1.97 as follows: The Spring Engaging Hook Assembly for Brake Spring Tools shown in U.S. Pat. No. 2,507,622 to Frank J. Brugmann; the Brake Spring Tool shown in U.S. Pat. No. 2,522,611 to R. N. Guth; the Spring Manipulating Tool shown in U.S. Pat. No. 1,953,930 to B. E. Dyal; the Brake Cable Release Tool shown in U.S. Pat. No. 3,540,106 to M. J. Goldman; the Spring Expander shown in U.S. Pat. No. 2,329,591 to H. C. Christian, and the Spring Expanding Device shown in U.S. Pat. No. 1,951,953 to J. Tollonitsch. Each known patent is noted to have partially addressed these long recognized problems of safety and control but has failed to provide the solution or meet the improvement found in the present invention.

The Rockwell Q-Series Brake or Q-Series Brake, manufactured by Rockwell International Automotive, Troy, Michigan, 48084 and other manufacturers, U.S. Pat. No. Re. 31,531, Mar. 6, 1984, is used in many heavy truck and bus brake assemblies and employs two heavy duty retaining springs to retain the assembly brake shoes in their proper position. The retaining springs have spring shanks with an inline shoulder between the spring hook and spring coil. The principal present method of retaining spring installation for the Rockwell Q-Series Brake assembly is accomplished by the operator attaching a pair of locking pliers to one of the spring shanks. The opposing spring hook is inserted in an aperture in one brake shoe. A screwdriver or a bar is then employed as a lever, utilizing the axle spindle or axle housing as the fulcrum, to move the pliers and hence expand the retaining spring to permit insertion of the spring hook in an aperture of a second brake shoe. The instability inherent in the use of such a lever renders installation difficult and frequently results in injury to the operator's hands and fingers. Operators presently have no tool which controls the retaining spring in its expanded state. An expansion tool permitting such control is needed within the industry to both facilitate the installation and removal of the retaining springs and to reduce the potential for injury during the process of spring manipulation and installation. The present invention is particularly adapted to accommodate the retaining springs utilized by the Rockwell Q-Series Brake.

SUMMARY OF THE INVENTION

In accordance with the present invention, a manually operable expansion tool is provided to expand a workpiece, which may be a spring, by grasping and controlling both ends of the workpiece thereby allowing its easy expansion, manipulation and installation or removal. A pair of pivotally movable jaws operable by pivotally movable elongated side members are configured to fit or receive the respective ends of a workpiece, and where the workpiece is a coil spring, the respective spring hooks or spring shanks. Opening of the jaws causes the workpiece or spring to be expanded. The workpiece or spring can then be easily manipulated for installation or removal.

The present invention comprises an improvement to workpiece expansion and manipulation tools and in particular to spring expansion, manipulation and installation tools wherein the improvement comprises a means for securing or grasping both ends of a workpiece, and where the workpiece is a coil spring, the respective spring shanks. The improvement is particularly directed to a jaw configuration which is adapted to grasping and controlling a coil spring wherein the respective spring shanks have an inclined or angular offset or an inline shoulder between the spring hook and spring coil.

The jaws, of the present invention, are generally rectangular in shape and are furcated to present two tines. A slot is defined by the tines provided in each jaw, respectively, with the slots terminating at their respective distal ends. The slots permit each jaw to engage the end of a workpiece, and, where the workpiece is a coil spring, the respective spring shanks of the coil spring.

Each tine, when the expansion tool is in its closed position, is substantially parallel to the remaining tine on its respective jaw and to the tines on the opposing jaw. The slots defined by the tines share a common axis when the expansion tool is in its closed position. A plane perpendicular to this common axis and passing through both tines of a jaw is substantially parallel to a plane perpendicular to the same common axis and passing through both tines of the opposing jaw.

An upstanding arm is rigidly affixed to one tine of one furcated jaw. A second upstanding arm is rigidly affixed to the respective tine on the opposing jaw. Each upstanding arm projects away from the opposing furcated jaw at an acute angle relative to the planes passing through the furcated jaws and projects toward the second tine of the respective furcated jaw. The terminus of each upstanding arm constitutes an upstanding arm bearing surface. The respective spring shanks of a coil spring received into the expansion tool jaws, while the expansion tool is in its closed position, would lie substantially along the common axis shared by the slots. Each spring shank so received into the expansion tool jaws would be grasped or held between the upstanding arm bearing surface and the opposing tine of each respective jaw.

BRIEF DESCRIPTION OF THE DRAWINGS

The foregoing and other features and advantages of the present invention will become more readily appreciated as the same become better understood by reference to the following detailed description of the preferred embodiment of the invention when taken in conjunction with the accompanying drawings, wherein.

DETAILED DESCRIPTION

Figure 1A:
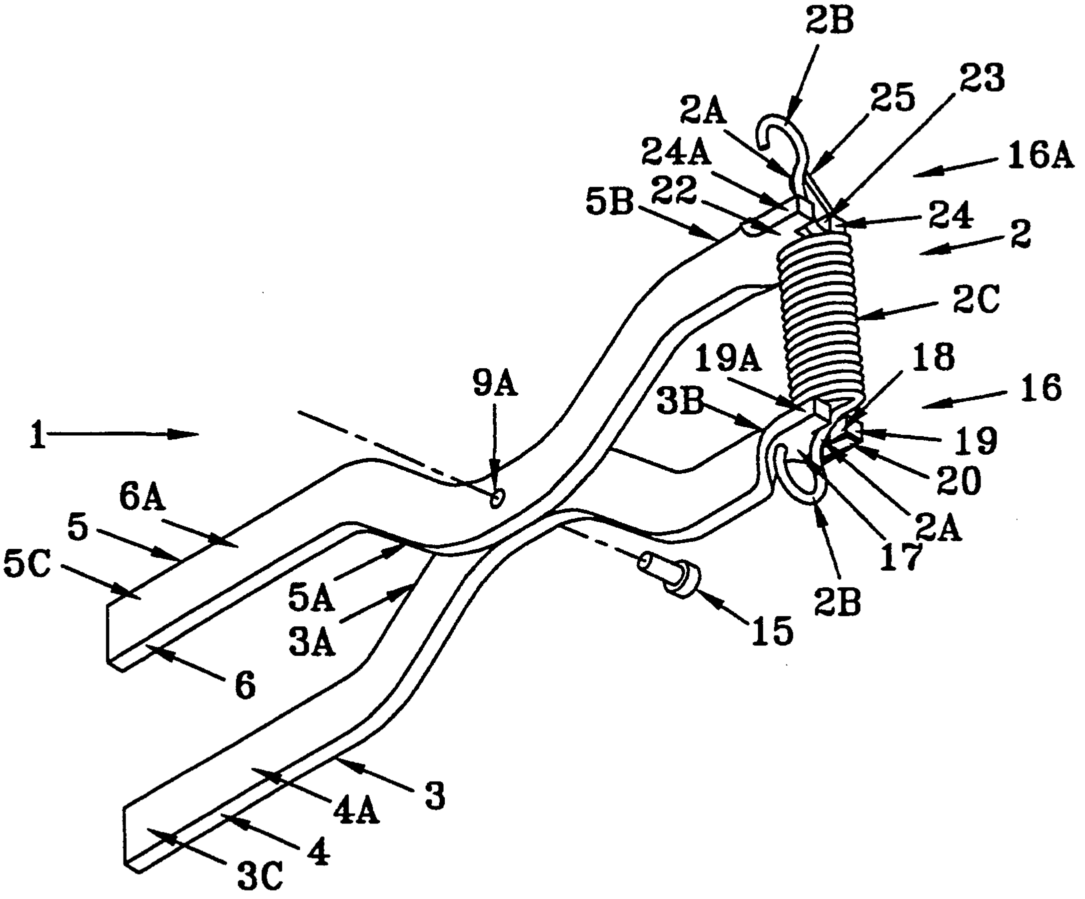
FIG. 1A is a perspective of the expansion tool, in its closed position, with a brake spring (workpiece) having an inline shoulder residing in the spring shank inserted in preparation for expansion.
Figure 1C:
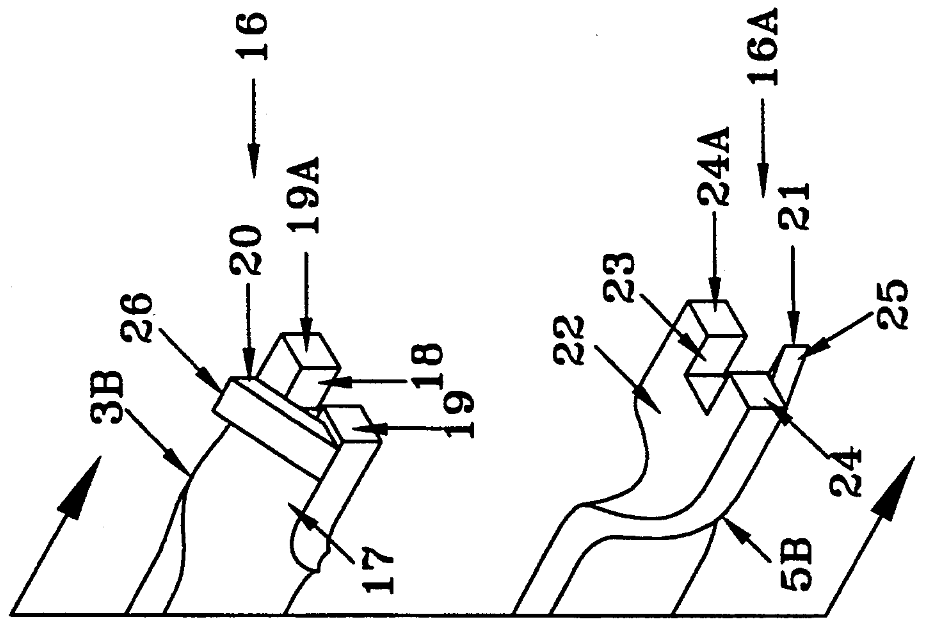
FIG. 1C is a perspective detail view of the expansion tool furcated jaws and upstanding arms.
Figure 1B:
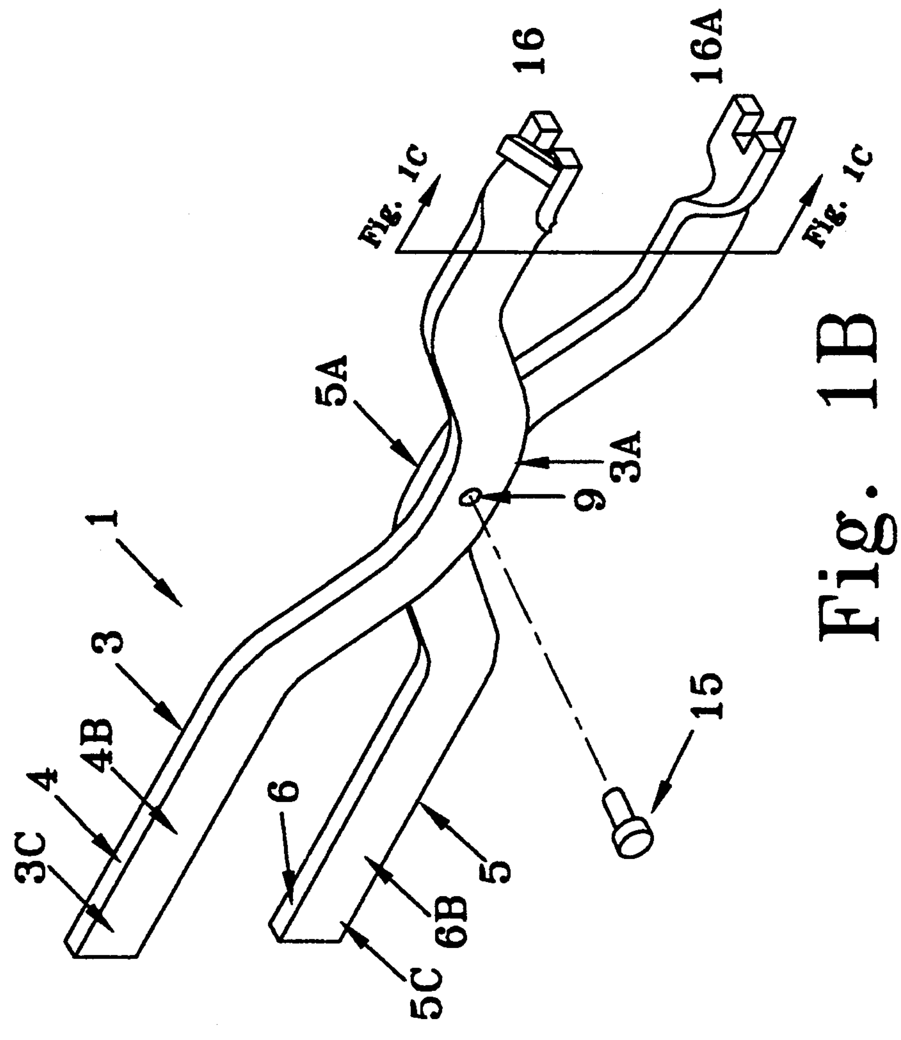
FIG. 1B is a perspective of the opposing side of the expansion tool, in its closed position.

The expansion tool FIG. 1A, 1B and 1C, illustrated in its closed position, is the preferred embodiment wherein a pair of elongated side members (3, 5) have a 1st surface (4A, 6A) and a 2nd surface (4B, 6B), a 1st end (3B, 5B) and 2nd end (3C, 5C) and terminate at the 1st end (3B, 5B) in a tool-head (16, 16A) presenting furcated jaws (17, 22) and at the 2nd end (3C, 5C) in handles (4, 6). Both elongated side members (3,5) have an elongated side member aperture (9, 9A) between their respective handles (4, 6) and furcated jaws (17, 22) penetrating from the 1st (4A, 6A) through the 2nd (4B, 6B) surface of bulbous central portions (3A, 5A) of the elongated side members (3, 5). The elongated side members (3, 5) are pivotally attached to each other by means of a pin (15) passing through the aligned elongated side member apertures (**9, 9*a***).

The furcated jaws (17, 22) each present two tines (**19, 19*a*, 24, 24*a*). The tines (19, 19*a*) of furcated jaw (17) and the tines (24, 24*a*) of furcated jaw 22 define slots (18, 23). The slots (18, 23), when the expansion tool is in its closed position, each share a common axis. A plane passing through the tines (19, 19*a*) of one furcated jaw (17) and perpendicular to the common axis shared by the slots (18, 23) is substantially parallel to a plane passing through the tines (24, 24*a*) of the opposing furcated jaw (22). An upstanding arm (20, 25) is rigidly affixed to one tine (19, 24) of each furcated jaw (17, 22). Each upstanding arm (20, 25) projects away from the opposing furcated jaw (17, 22) at an acute angle relative to the planes passing through the furcated jaws(17, 22) and projects toward the second tine (19*a*, 24*a*) of the respective furcated jaw (17, 22). The terminus of each upstanding arm (20, 25) constitutes an upstanding arm bearing surface (21, 26**).

Figure 2A:
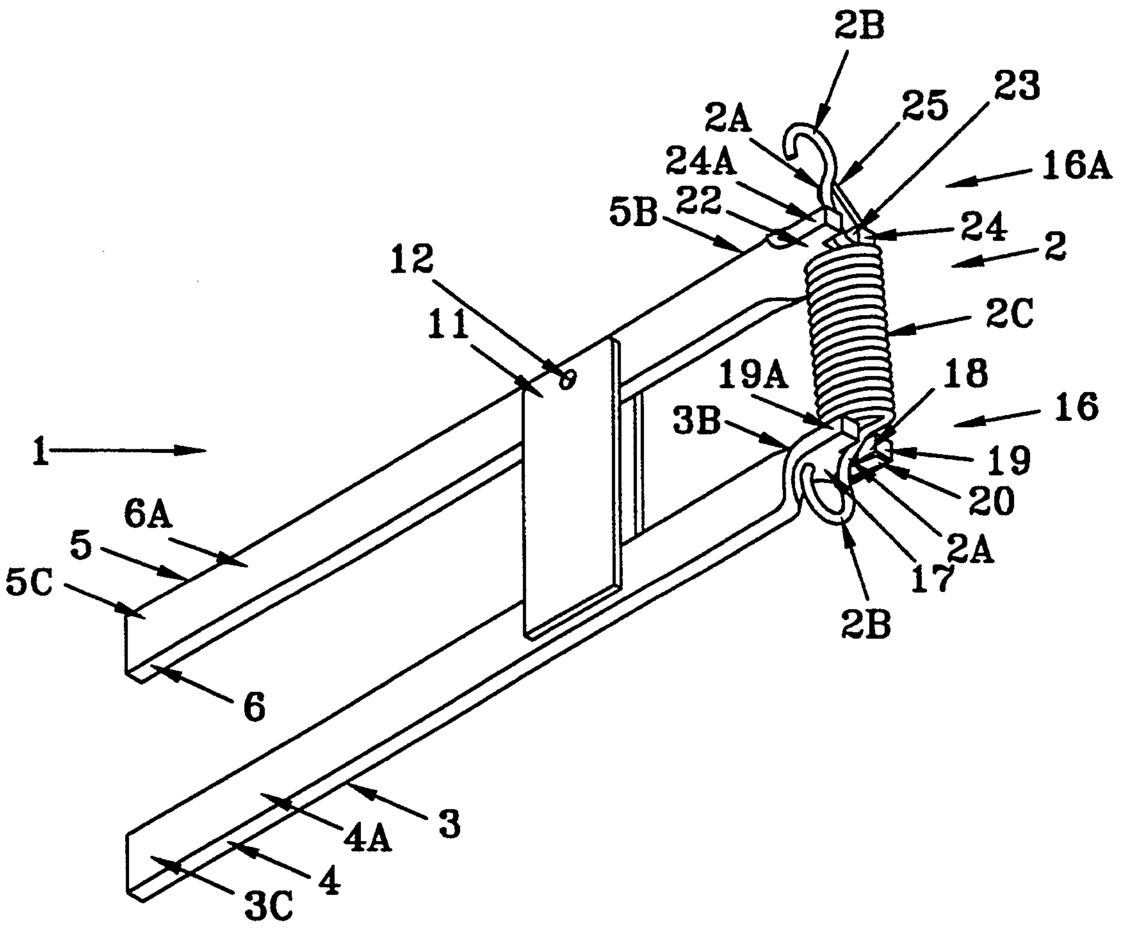
FIG. 2A shows an alternative embodiment of the expansion tool,in its closed position, with a brake spring (workpiece) having an inline shoulder residing in the spring shank inserted in preparation for expansion.
Figure 2B:
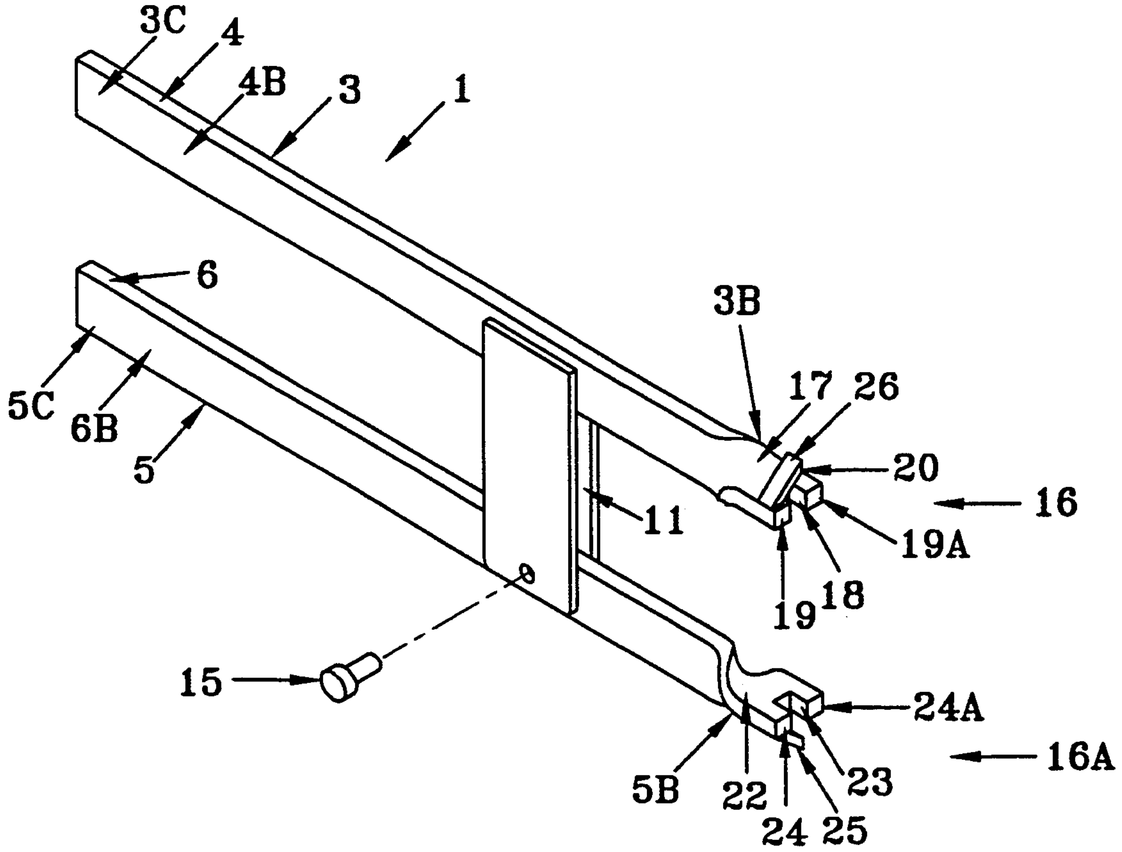
FIG. 2B shows the reverse side of the alternative embodiment of the expansion tool.
Figure 2C:
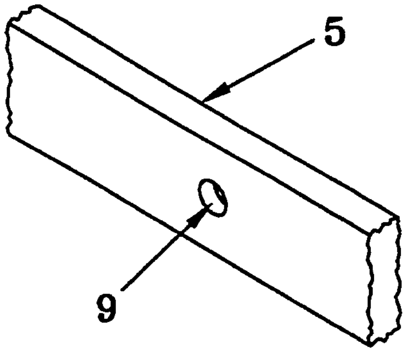
FIG. 2C is a perspective detail view of the expansion tool elongated side member with elongated side member aperture.

An alternative embodiment is shown in FIG. 2A, 2B, and 2C wherein a pair of elongated side members (3, 5) have a 1st (4A, 6A) and a 2nd (4B, 6B) surface, a 1st end (3B, 5B) and 2nd end (3C, 5C) and terminate at the 1st end (3B, 5B) in a tool-head (16, 16A) presenting furcated jaws (17, 22)and at the 2nd end (3C, 5C) in handles (4, 6). One elongated side member (5) has an elongated side member aperture (9) between the handle (6) and the furcated jaw (22) penetrating from the 1st (6A) through the 2nd (6B) surface. A pair of connecting members (11, 13) have connecting member apertures (12, 14) at one end. Connecting member (11) is rigidly affixed, at the end distal from the connecting member aperture (12), to the 1st (4A) surface of one elongated side member (3). The second connecting member (13) is rigidly affixed, at the end distal from the connecting member aperture (14) to the 2nd (4B) surface of the elongated side member (3). Both connecting members (11, 13) project in the same relative position laterally from the elongated side member (3). The connecting members (11, 13) are pivotally affixed to the opposing elongated side member (5) by means of a pin (15) inserted through one connecting member aperture (12), the elongated side member aperture (9), and the second connecting member aperture (14).

The furcated jaws (17, 22), shown in detail in FIG. 1C, each present two tines (**19, 19*a*, 24, 24*a*). The tines (19, 19*a*) of furcated jaw (17) and the tines (24, 24*a*) of furcated jaw 22 define slots (18, 23). The slots (18, 23), when the expansion tool is in its closed position, each share a common axis. A plane passing through the tines (19, 19*a*) of one furcated jaw (17) and perpendicular to the common axis shared by the slots (18, 23) is substantially parallel to a plane passing through the tines (24, 24*a*) of the opposing furcated jaw (22). An upstanding arm (20, 25) is rigidly affixed to one tine (19, 24) of each furcated jaw (17, 22). Each upstanding arm (20, 25) projects away from the opposing furcated jaw (17, 22) at an acute angle relative to the planes passing through the furcated jaws(17, 22) and projects toward the second tine (19*a*, 24*a*) of the respective furcated jaw (17, 22). The terminus of each upstanding arm (20, 25) constitutes an upstanding arm bearing surface (21, 26).

While a preferred embodiment of the present invention has been shown and described, it will be apparent to those skilled in the art that many changes and modifications may be made without departing from the invention in its broader aspects. The appended claims are therefore intended to cover all such changes and modifications as fall within the true spirit and scope of the invention.

I claim:

1. An expansion Tool comprising:

A. a pair of elongated side members having a 1st and a 2nd surface and terminating at one end in handles and at the opposing end in furcated jaws;

B. an elongated side member aperture intermediate between the handle and the furcated jaw penetrating from the 1st through the 2nd surface of each elongated side member; said elongated side member apertures of each of the pair of elongated side members aligned to receive a pin pivotally attaching the pair of elongated side members;

C. the furcated jaws each presenting at least two tines; the tines of said furcated jaws defining slots to receive brake spring shanks or hooks; said slots each sharing a common axis such that a plane passing through the tines of one of the furcated jaws and perpendicular to the common axis shared by the slots is parallel to a plane passing through the tines of the second furcated jaw;

D. an upstanding arm rigidly affixed to one tine of each furcated jaw; each upstanding arm projecting away from the opposing furcated jaw at an acute angle relative to the plane passing through the furcated jaws and projecting toward the opposing tine of the respective furcated jaw.

2. An expansion tool according to claim 1 wherein said furcated jaws and upstanding arm are dimensioned to receive an inline shoulder of a retaining brake spring.

3. An expansion tool comprising:

A. a pair of elongated side members having a 1st and a 2nd surface, a bulbous central portion, and terminating at one end in handles and at the opposing end in furcated jaws;

B. an elongated side member aperture intermediate between the handle and the furcated jaw penetrating from the 1st through the 2nd surface of the bulbous central portion of each elongated side member; said elongated side member apertures of each of the pair of elongated side members aligned to receive a pin pivotally attaching the pair of elongated side members;

C. the furcated jaws each presenting at least two tines; the tines of said furcated jaws defining slots to receive brake spring shanks or hooks; said slots each sharing a common axis such that a plane passing through the tines of one of the furcated jaws and perpendicular to the common axis shared by the slots is parallel to a plane passing through the tines of the second furcated jaw;

D. an upstanding arm rigidly affixed to one tine of each furcated jaw; each upstanding arm projecting away from the opposing furcated jaw at an acute angle relative to the plane passing through the furcated jaws and projecting toward the opposing tine of the respective furcated jaw.

4. An expansion tool comprising:

A. a pair of elongated side members having a 1st and a 2nd surface, a bulbous central portion, and terminating at one end in handles and at the opposing end in furcated jaws;

B. an elongated side member aperture intermediate between the handle and the furcated jaw penetrating from the 1st through the 2nd surface of the bulbous central portion of each elongated side member;

C. the furcated jaws each presenting at least two tines; the tines of said furcated jaws defining slots to receive brake spring shanks or hooks; said slots each sharing a common axis such that a plane passing through the tines of one of the furcated jaws and perpendicular to the common axis shared by the slots is parallel to a plane passing through the tines of the second furcated jaw;

D. an upstanding arm rigidly affixed to one tine of each furcated jaw; each upstanding arm projecting away from the opposing furcated jaw at an acute angle relative to the plane passing through the furcated jaws and projecting toward the opposing tine of the respective furcated jaw;

E. said upstanding arms and said furcated jaws adapted to receive an inline shoulder of a retaining brake spring.

5. An expansion tool comprising:

A. a pair of elongated side members terminating at one end in handles and at the opposing end in furcated jaws;

B. a pair of connecting members having connecting member apertures at one end; said first connecting member rigidly affixed, at the end distal from the connecting member aperture, to the 1st surface of one elongated side member; said second connecting member rigidly affixed, at the end distal from said connecting member aperture to the 2nd surface of said elongated side member to which the first connecting member is attached; both connecting members projecting in the same relative position orthogonally from said elongated side member; said connecting members pivotally affixed to said opposing elongated side member by means of a pin inserted through said connecting member apertures and said elongated side member aperture;

C. said furcated jaws each presenting at least two tines; said tines of said furcated jaws defining slots; said slots sharing a common axis wherein a plane passing through the tines of one furcated jaw and perpendicular to the common axis shared by said slots is parallel to a plane passing through the tines of said second furcated jaw;

D. an upstanding arm rigidly affixed to one tine of each of each furcated jaws; each upstanding arm projecting away from the opposing furcated jaw at an acute angel relative to the plane passing through said furcated jaw and projecting toward the opposing tine of the respective furcated jaw.

6. An expansion tool according to claim 5 wherein said furcated jaws and upstanding arm are dimensioned to receive an inline shoulder of a retaining brake spring.

7. An expansion tool comprising:

A. a pair of elongated side members terminating at one end in handles and at the opposing end in furcated jaws;

B. a pair of connecting members having connecting member apertures at one end; said first connecting member rigidly affixed, at the end distal from the connecting member aperture, to the 1st surface of one elongated side member; said second connecting member rigidly affixed, at the end distal from said connecting member aperture to the 2nd surface of said elongated side member to which the first connecting member is attached; both connecting members projecting in the same relative position orthogonally from said elongated side member; said connecting members pivotally affixed to said opposing elongated side member by means of a pin inserted through said connecting member apertures and said elongated side member aperture;

C. said furcated jaws each presenting at least two tines; said tines of said furcated jaws defining slots; said slots sharing a common axis wherein a plane passing through the tines of open furcated jaw and perpendicular to the common axis shared by said slots is parallel to a plane passing through the tines of said second furcated jaw;

D. an upstanding arm rigidly affixed to one tine of each of each furcated jaws; each upstanding arm projecting away from the opposing furcated jaw at an acute angle relative t the plane passing through said furcated jaw and projecting toward the opposing tine of the respective furcated jaw;

E. said upstanding arms and said furcated jaws adapted to receive an inline shoulder of a retaining brake spring.

8. An expansion tool comprising:

A. a first and second tool-head each presenting a furcated jaw adapted to receive a brake spring shank or hook of a retaining brake spring;

B. the furcated jaws each presenting at least two tines; the tines of said furcated jaws defining slots to receive said brake spring shanks or hooks; said tool-heads oriented to cause said slots to share a common axis such that a plane passing through the tines of one of the furcated jaws and perpendicular to the common axis shared by the slots is parallel to a plane passing through the tines of the second furcated jaw;

C. an upstanding arm rigidly affixed to one tine of each furcated jaw; each upstanding arm projecting away from the opposing furcated jaw at an acute angle relative to the plane passing through the furcated jaws and projecting toward the opposing tine of the respective furcated jaw;

D. means connecting said first and second tool-head to allow said first and second tool-head to operate in concert to effect the expansion of said retaining brake spring.

9. An expansion tool according to claim 8 wherein said furcated jaws and upstanding arm are dimensioned to receive an inline shoulder of a retaining brake spring.

* * * * *